(12) United States Patent
Kitamura

(10) Patent No.: US 6,829,956 B2
(45) Date of Patent: Dec. 14, 2004

(54) INSPECTION APPARATUS

(75) Inventor: Kouta Kitamura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 276 days.

(21) Appl. No.: 10/166,082

(22) Filed: Jun. 11, 2002

(65) Prior Publication Data

US 2003/0033895 A1 Feb. 20, 2003

(30) Foreign Application Priority Data

Aug. 17, 2001 (JP) .................................... 2001-247682

(51) Int. Cl.[7] .......................... G01M 19/00; G01N 19/00
(52) U.S. Cl. .................................... 73/865.9; 73/865.8
(58) Field of Search .............................. 73/865.8, 865.9

(56) References Cited

U.S. PATENT DOCUMENTS

| | | | | |
|---|---|---|---|---|
| 4,280,136 A | * | 7/1981 | Kashima et al. ............... | 348/86 |
| 4,818,169 A | * | 4/1989 | Schram et al. ........ | 414/331.18 |
| 4,894,733 A | * | 1/1990 | Odaka .......................... | 360/31 |
| 5,164,905 A | * | 11/1992 | Iwasaki et al. ............. | 700/112 |
| 5,646,776 A | * | 7/1997 | Bacchi et al. ................ | 359/393 |
| 6,324,298 B1 | * | 11/2001 | O'Dell et al. ............... | 382/149 |
| 6,681,038 B2 | * | 1/2004 | Vilella ........................ | 382/145 |

FOREIGN PATENT DOCUMENTS

EP              299316 A2 * 1/1989 ......... G11B/23/113

* cited by examiner

Primary Examiner—C D Garber
(74) Attorney, Agent, or Firm—Sughrue Mion, PLLC

(57) ABSTRACT

The object of the present invention is to provide an inspection apparatus which enables the speed-up and high efficiency of an inspection as well as the flexibility to the modification of an assembly line. The present invention provides an inspection apparatus, which is directly connected to an assembly line and employed for inspections of a work (magnetic tape cartridge) after assembly, including: an arrival platform to which the work after assembly is carried in; an inspection table on which the work is inspected; a departure platform from which the work after inspection is carried out; a robot for moving the work which has completed inspections on the inspection table to the departure platform as well as moving the work carried in to the arrival platform to the inspection table; and a fixture for fixing the work moved to the inspection table while inspecting the work, wherein a plurality of inspections are performed in parallel while the work is fixed on the inspection table.

24 Claims, 10 Drawing Sheets

INSPECTION APPARATUS

FIELD OF THE INVENTION

The present invention relates to an inspection apparatus, with which the high working efficiency can be attained and which has the flexibility for the layout modification of an assembly line.

BACKGROUND OF THE INVENTION

When an industrial product is manufactured and brought on the market, quality inspection has been performed generally for the product in the middle or at the end of the production/assembly line in order that the stable quality of the product may be maintained. In a manufacturing plant of magnetic tape cartridge, inspection is performed for a tape cartridge to check whether or not it satisfies the requirements specified by the standards and those internal by the manufacturer.

The conventional quality inspection has been performed on a step by step basis by a man or an inspection apparatus each time a product reaches some manufacturing or assembly stage which allows it to undergo an inspection. For example, the inspection for the normal operation of a moving part has been conducted in such a manner that an inspector manually moves the moving part or the load required for the operation is checked if it lies within a given range of values by an inspection apparatus after the completion of the moving part assembly. When plural inspections are conducted, the subsequent inspection with one inspection unit is performed in series after the completion of an inspection with another inspection unit.

A dedicated inspection unit has been required for each inspection, when the subsequent inspection is performed in series after the completion of an inspection. Fixing and positioning of a product have been required for each inspection before starting it with an inspection unit. Therefore, there has been the problem that the facility costs increase in terms of the inspection units and their space, and the inspections require a large amount of time as well.

The layout of an assembly line requires modifications depending on the production output and the product specification. Conventionally, when the assembly line has plural inspection units, each of them has requested reinstallation in order to accommodate the modifications. As the inspection units require the measurement accuracy generally, the readjustment peculiar to an inspection unit—checking of the parallelism, the output and others—is necessary, when the inspection unit is moved. It is therefore troublesome to reinstall and readjust the inspection units each time the layout of the assembly line is modified, which is an obstacle to improve a product and raise the productivity.

SUMMARY OF THE INVENTION

The object of the present invention to assess the problems mentioned above is to provide an inspection apparatus which enables the speed-up and high efficiency of inspection as well as the flexibility to the modification of an assembly line.

The present invention provides an inspection apparatus, which is directly connected to an assembly line and employed for inspections of a work after assembly, comprising: an arrival platform to which the work after assembly is carried in; an inspection table on which the work is inspected; a departure platform from which the work after inspection is carried out; a transfer unit for moving the work which has completed inspections on the inspection table to the departure platform as well as moving the work carried in to the arrival platform to the inspection table; and a fixture for fixing the work moved to the inspection table while inspecting the work, wherein a plurality of inspections are performed in parallel while the work is fixed on the inspection table.

As the requirements of plural inspections for a magnetic tape cartridge in conformity with the LTO (Linear Tape Open) standard, included are four inspections: (a) write protect operation inspection for measuring the force to open or close the inadvertent erasing protector, (b) door opening force inspection for measuring the force to open the sliding door, (c) reel lock release force inspection for measuring the force to release the reel lock mechanism and (d) leader pin/spring contact inspection to check the contact between the leader pin spring and the leader pin. Among these inspection requirements, at least two inspections would be preferably performed in parallel. It goes without saying that another inspection may be added.

This type of inspection apparatus performs the plural inspections in parallel while a work—moved from the arrival platform by a transfer unit—is fixed by a fixture on the inspection table. Fixing of the work conducted for each inspection conventionally can be combined to one operation and the inspections are performed in parallel as well. The inspection apparatus thus enables the reduction in time required for the inspections.

The flatness inspection of the cartridge case, which is for measuring the flatness of the base plate of the cartridge case, would be preferably performed at either of the following steps: before fixing of the work by the fixture after the transfer unit brings the work of magnetic tape cartridge to the inspection table or after releasing of the work by the fixture following the completion of the inspections. The reason for it is that the flatness inspection of the cartridge case must be performed while it is not fixed.

Thus the inspections for the magnetic tape cartridge can be speeded up more.

The present inspection apparatus can accommodate flexibly the layout modification of the assembly line, since all required is to move and place only the inspection apparatus so that the arrival platform may be directly connected to the assembly line, and perform leveling and adjustment for only the particular inspection apparatus. Apparently it looks like easy to conduct two inspections in parallel, though it has not been brought into practice conventionally. The present invention enables the parallel inspection, thereby improving the efficiency of a production system.

Performing inspections in parallel does not strictly means that the start and finish of one inspection coincide with those of the other. It includes that one inspection is started before the completion of the other inspection overlapping some portions of respective inspections.

DESCRIPTION OF THE PREFERRED EMBODIMENTS

Figure 1:
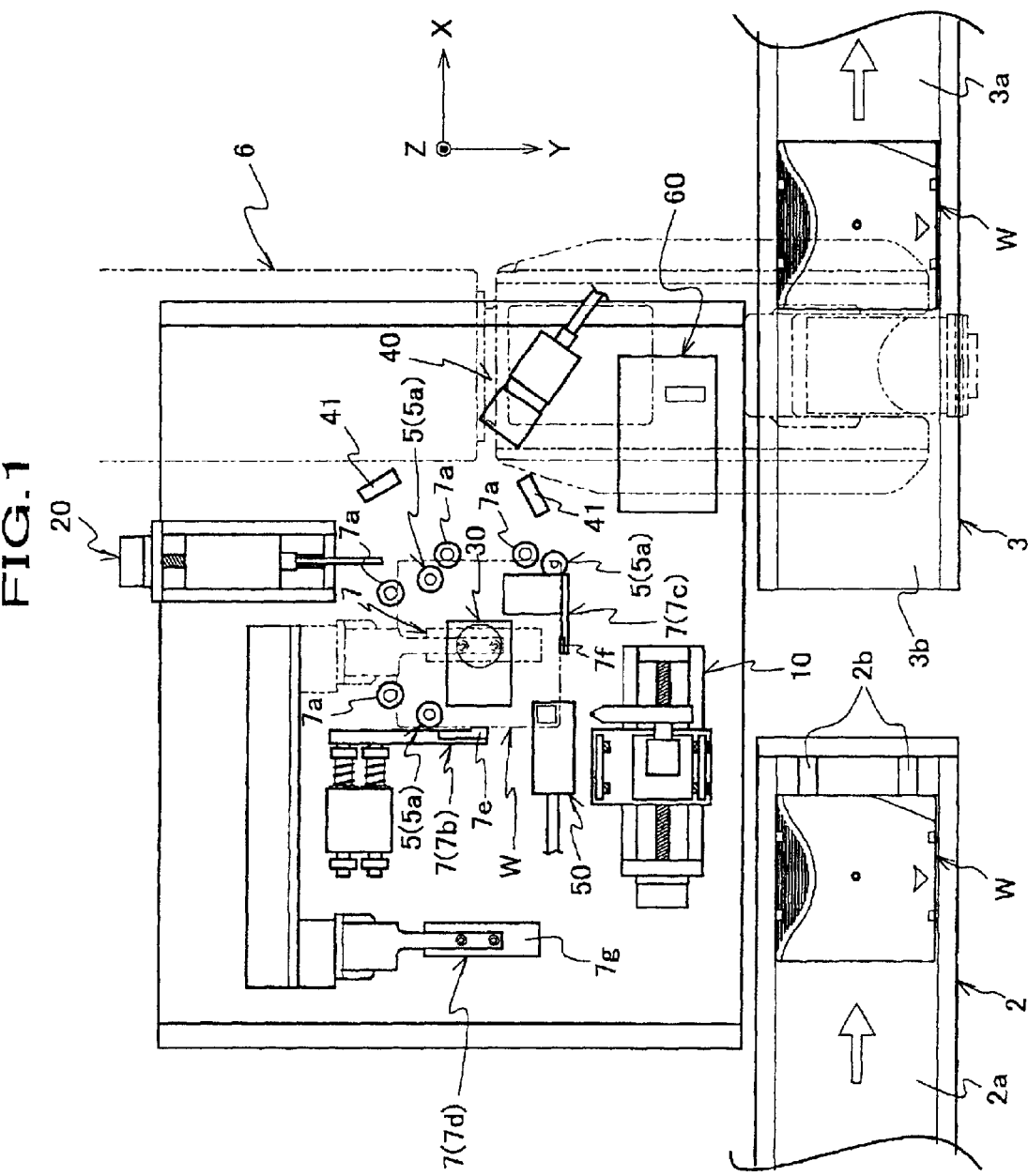
FIG. 1 is an overall top view showing the inspection apparatus according to the embodiment.

The embodiment applying the present invention to a magnetic tape cartridge in conformity with the LTO standard will now be described referring to the accompanying drawings. FIG. 1 is an overall top view illustrating the inspection apparatus according to the embodiment of the present invention. The coordinates of FIG. 1 is defined for convenience as follows: right corresponds to X direction, downward to Y and out of the sheet to Z.

As shown in FIG. 1, an inspection apparatus 1 according to the embodiment includes; an arrival platform 2 to which a magnetic tape cartridge W after the completion of the assembly is carried in, an inspection table 5 on which the magnetic tape cartridge W is inspected, a departure platform 3 to which the magnetic tape cartridge W after the completion of inspection on the inspection table 5 is moved, a robot 6 for moving the magnetic tape cartridge W—carried in to the arrival platform 2—to the inspection table 5 as well as moving the magnetic tape cartridge W—completed the inspection on the inspection table 5—to the departure platform 3, and a fixture 7 for fixing the magnetic tape cartridge W moved to the inspection table 5 while the inspection is in process. And as the units employed for the inspection of the magnetic tape cartridge W, included are; a write protect operation force inspection unit (hereinafter referred to as operation force inspection unit) 10, a door open force inspection unit 20, a reel lock release force inspection unit (hereinafter referred to as release force inspection unit) 30, a leader pin/spring contact inspection unit (hereinafter referred to as contact inspection unit) 40, a cartridge case flatness inspection unit (hereinafter referred to as flatness inspection unit) 50, and a cartridge memory read/write inspection unit (hereinafter referred to as CM inspection unit) 60.

The magnetic tape cartridge W serving as a work of the inspection in the present embodiment will be described first.

Figure 3:
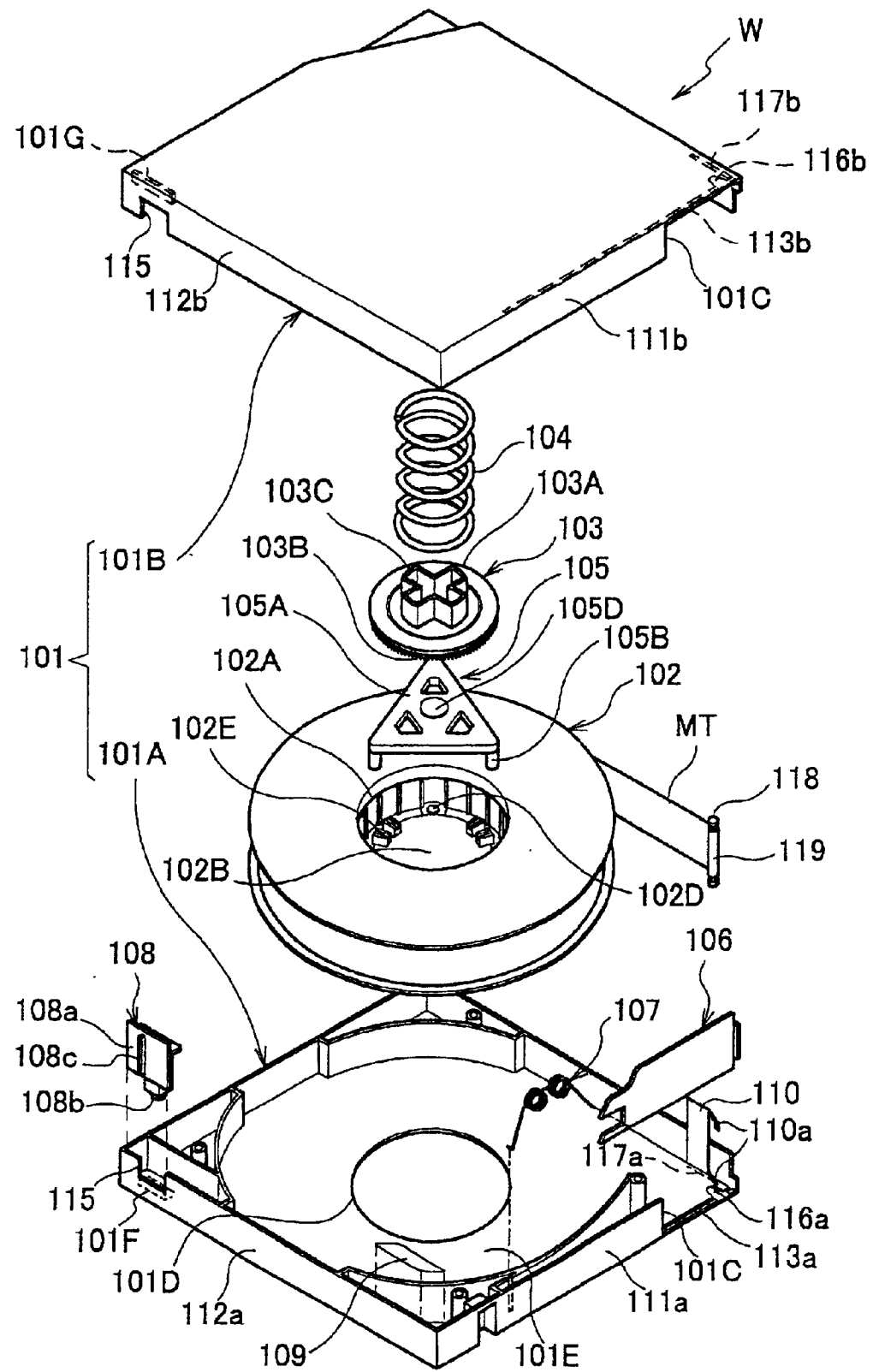
FIG. 3 is an exploded perspective view showing the parts of a magnetic tape cartridge according to the embodiment.

FIG. 3 is an exploded perspective view illustrating the parts of the magnetic tape cartridge W of an embodiment. As shown in FIG. 3, the magnetic tape cartridge W includes a lower half section 101A and an upper half section 101B, which form a cartridge case 101. Inside the lower half section 101A and the upper half section 101B, the following are housed; a reel 102 around which a magnetic tape MT is wound, a lock plate 103, a compression coil spring 104, a release pad 105, a sliding door 106, a torsion coil spring 107, an inadvertent erasing protector 108, a cartridge memory (memory chip) 109 and a leader pin spring 110.

An opening 101C, which lies across the lower half section 101A and the upper half section 101B, for extracting the magnetic tape MT is provided near the corner of a side wall of the cartridge case 101. The opening 101C is opened or closed by the sliding door 106, which slides along the side wall 111a of the lower half section 101A and the side wall 111b of the upper half section 101B. The torsion coil spring 107, which has two coils, imposes the force on the sliding door 106 in the closing direction continuously.

The lower half section 101A and the upper half section 101B, each of which is a half of the cartridge case 101, are mated to form the cartridge case 101.

Inside the lower half section 101A, a shallow guide groove 113a is carved on the base plate 101E along the inside of the side wall 111a, so that the sliding door 106 may slide smoothly. An access window 115 through which the inadvertent erasing protector 108 is opened or closed is provided lying across side walls 112a and 112b, which are located in the left in FIG. 3.

The inner surface of the upper half section 101B (not shown) is formed approximately symmetrical with that of the lower half section 101A. The upper guide groove 113b, which guides the top of sliding door 106, is carved inside the opening 101C along the side wall 111b.

The inadvertent erasing protector 108 has a front portion 108a of a plate as a main body. On the rear of the front portion 108a a guide projection 108b is formed integrally toward the lower half 101A with a cylindrical end. On the outer surface of the front portion 108a facing the access window 115, a rib 108c projects, which a user nips in order to open or close the inadvertent erasing protector 108.

An oval guide hole 101F is provided on the base plate 101E of the lower half section 10A—where the guide projection 108b faces—along the side wall 112a. The guide projection 108b is inserted into the guide hole 101F, thereby allowing the inadvertent erasing protector 108 to slide along the side wall 112a. On the other hand on the inner surface of the upper half section 101B, a guide rib 101G projects so as to lie along the rear of the front portion 108a. The top of the inadvertent erasing protector 108 is guided slidably by the guide rib 101G. The inadvertent erasing protector 108 has a flexible rib (not shown) projecting from the rear of the front portion 108a, which is inserted into the groove (not shown) carved on the guide rib 101G for the stop position, so that the inadvertent erasing protector 108 may stop at the write or write inhibited position with an appropriate play.

A leader pin 118 of metal is clamped by a clip 119 at the head of the magnetic tape MT. A recording playback unit holds the leader pin 118 when it retracts the magnetic tape MT through the opening 101C. On the lower surface of a cup-like hub 102A of the reel 102 is provided a face gear 102C (see FIG. 6) for driving the reel 102, which is exposed through a circular opening 101D made in the center of the base plate 101E of the lower half section 101A.

A U-shaped concave holder 116a, which opens toward the opening 101C, is formed near the opening 101C on the base plate 101E of the lower half section 101A. Similarly, a concave holder 116b is formed in the upper half section 101B. The leader pin 118 will be housed in the concave holders 116a and 116b when it enters the cartridge case 101. Both ends of the leader pin 118 start entering the opening side of U-shape and enter deep in the U-shape so that the leader pin 118 may be housed in the concave holders 116a and 116b. A V-shaped press member 110a of a metallic leader pin spring 110 overhangs the concave holders 116a and 116b. The press member 110a is so arranged that it may be in contact with the leader pin 118, when the leader pin 118 is removed from or installed in the cartridge case 101. So the leader pin 118 is removed or installed while deforming the pressing member 110a, thereby temporarily fixed with a given load.

The leader pin spring 110 is inserted into narrow positioning grooves 117a and 117b carved on the inner surfaces of the lower half section 101A and the upper half section 101B respectively so that the position of the leader pin spring 110 may be fixed.

A lock plate 103 has a disk-like main plate 103A, which can be housed in the cup-like hub 102A of the reel 102. On the periphery of the lower surface of the main plate 103A an engagement plane 103B of sawtooth with a cross section of triangle is formed, which has a radial tooth trace and can be engaged or disengaged with an engagement plane 102E in the cup-like hub 2A. In the middle of the upper plane of the main plate 103A an engagement tube 103C with a cross-like section is placed, into which four engagement projections (not shown) standing in the middle of the inner plane of the upper half section 101B are inserted. And the lock plate 103 is pressed by a compression coil spring 104, which is installed around an engagement tube 103C and interposed between the upper half section 101B and the lock plate 103, thereby engaging the engagement plane 103B of sawtooth with a cross section of triangle with the engagement plane 102E on the base plate 102B of the cup-like hub 102A detachably.

A release pad 105 includes a main pad 105A, which is of an approximately equilateral triangle plate with corners shaped like an arc and interposed between the inner (upper) surface of the base plate 102B of the cup-like hub 102A and the lock plate 103. Three cylindrical lock release pins 105B (only two are shown in FIG. 3), which are guided by three guide holes 102D respectively (only one shown in FIG. 3) that are made on the base plate 102B of the cup-like hub 102A, extend continuously from arc-like side surfaces of the respective corners. In the middle of the main pad 105A, a spherical projection 105D is formed, which makes point contact with another spherical projection (not shown) formed in the middle of the lower surface of the main plate 103A of the lock plate 103.

The reel lock mechanism for locking the rotation of the reel 102 includes the release pad 105, the lock plate 103, the compression coil spring 104 and the guide holes 102D of the reel 102. When locking of the reel 102 is released, the face gear of a driving unit engages with the face gear 102C of the reel 102 and at the same time thrusts the rock release pins 105B of the release pad 105. Further, the release pad 105 thrusts the lock plate 103, thereby disengaging the engagement plane 103B of the lock plate 103 from the engagement plane 102E of the reel 102 to release the lock.

[Inspection Apparatus 1]

The arrival platform 2, the departure platform 3, the inspection table 5, the robot 6 and the fixture 7 of the inspection apparatus 1 will be described referring to FIG. 1.

The arrival platform 2 is a unit, which carries in the magnetic tape cartridge W after the completion of the assembly by a carrier such as a roller conveyer or belt conveyer, keeps it at a given position for the subsequent operation. In the present embodiment, the starting portion of a belt conveyer 2a is connected to the belt conveyer of the assembly line (not shown). A stopper 2b is provided at the end portion of the belt conveyer 2a, and thus the tape cartridge W is automatically carried in to the inspection apparatus 1 and stopped at a given position. The carrier employed for the arrival platform 2 is not limited to the conveyers but another means which can hold and carry in the work such as a robot etc. to a given position may be an alternative.

The departure platform 3 is a unit which carries out the magnetic tape cartridge W after the completion of the inspection by such a carrier as a roller conveyer or a belt conveyer. In the present embodiment, the magnetic tape cartridge W is set at the starting portion 3b of a belt conveyer 3a so that the magnetic tape cartridge W may be carried out from the inspection apparatus 1 to the following process.

The end portion of the belt conveyer 3a is, for example, connected to the process of visual inspection by a man or the packing process. The carrier employed for the departure platform 3 is not limited to the conveyers but another means such as a robot etc. may be an alternative like the arrival platform 2.

The inspection table 5 is a table on which the magnetic tape cartridge W is set in order to perform the required inspections. In the present embodiment, the inspection table 5 serves concurrently as a part of the flatness inspection unit 50. The inspection table 5 includes three pins 5a which support the points near the three out of four corners of the magnetic tape cartridge W on the lower surface. As shown in FIG. 1, the three pins 5a are positioned so that they support the three points near the corners from under—upper left, upper right and lower right—of the magnetic tape cartridge W. The heights of the three pins are adjusted to be the same, so that the lower surface of the magnetic tape cartridge W is supported horizontally.

In the present embodiment the inspection table 5 includes the three pins 5a for performing the flatness inspection, though any type of table may be alternatively employed as long as it can support securely the work in a given position when the flatness inspection is not necessary. For example, one plane table with the same shape as that of the base of the magnetic tape cartridge W or another table supporting the magnetic tape cartridge W in a vertical position may be an alternative.

Figure 2:
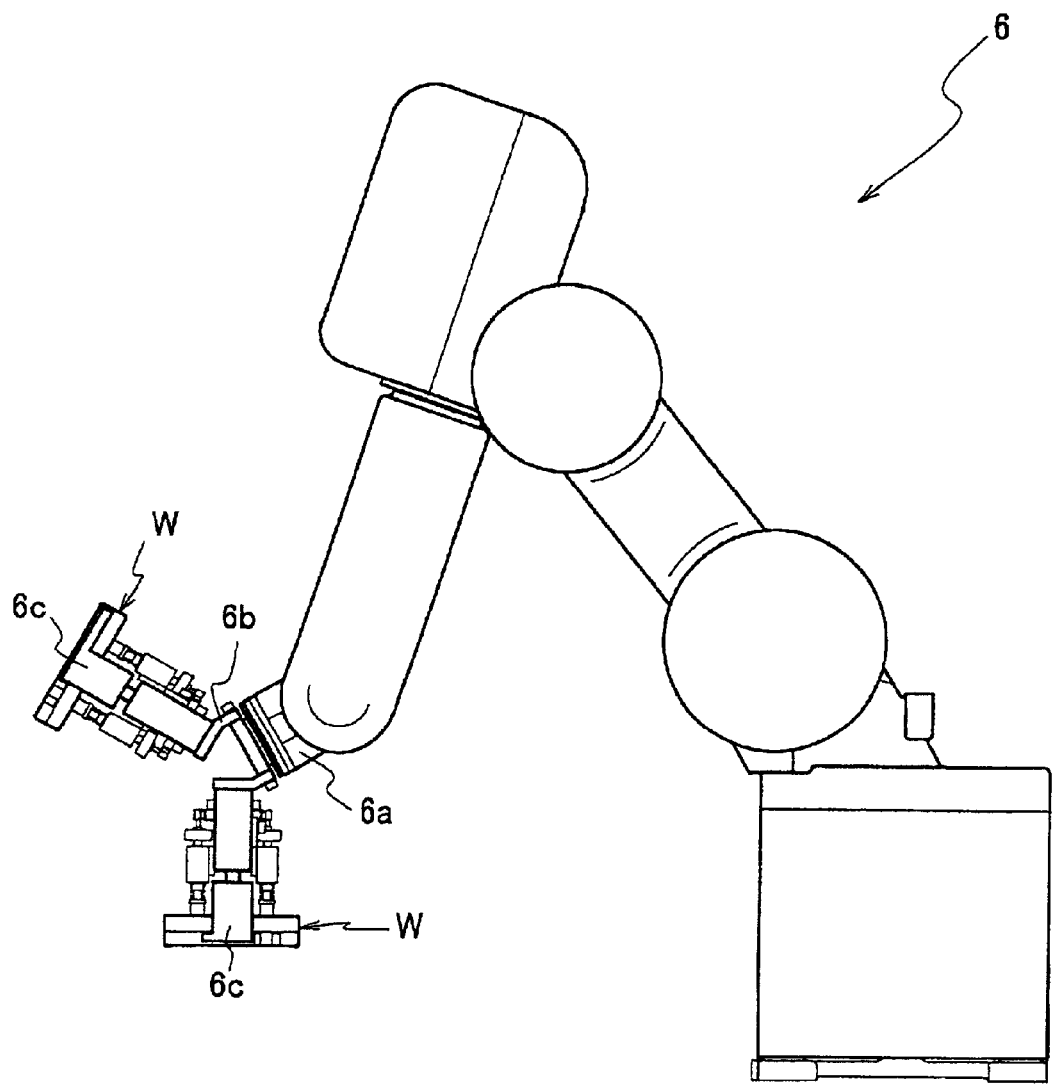
FIG. 2 is a side view showing the robot.

The robot 6 is, as shown in FIG. 2, an all-purpose robot with multiaxial articulated joints. A hand 6b of an arm 6a has the two of chucks 6c, which are for grabbing the sides of the magnetic tape cartridge W. The two of chucks 6c are positioned axially symmetrical around the axis of the arm 6a so that they can exchange the positions by rotating the hand 6b 180 deg. around the arm 6a.

When the robot 6 moves a magnetic tape cartridge W, the robot 6 picks up a first assembly completed magnetic tape cartridge W with one of the two chucks 6c—both free at the beginning—from the arrival platform 2 and moves the hand 6b over the inspection table 5. On the way or after moving the hand 6b, the robot 6 rotates the hand 6b 180 deg. around the arm 6a, thereby positioning the other free chuck 6c downward. When the inspection of a second magnetic tape cartridge W on the inspection table 5 is completed, the robot 6 lowers the hand 6b and picks up the second magnetic tape cartridge W by the free chuck 6c. Then the robot 6 rotates the hand 6b 180 deg. around the arm 6a to position the first magnetic tape cartridge W downward, lowering the hand 6b to rest it on the inspection table 5. Subsequently, the robot 6 moves the hand 6b over the departure platform 3 rotating it 180 deg. around the arm 6a, then resting the second magnetic tape cartridge W after the inspection on the departure platform 3.

The robot 6 used as a transfer unit may have only one chuck of the hand 6b. The transfer unit may be so arranged that not an all-purpose robot but a dedicated crane moves the work from the arrival platform 2 to the inspection table 5 or from the inspection table 5 to the departure platform 3.

The fixture 7 includes; support pins 7a which support the upper and right sides of the magnetic tape cartridge W shown in FIG. 1, an X-axis fixing pad 7b which fixes the magnetic tape cartridge W in the X direction, a Y-axis fixing pad 7c in the Y direction and a Z-axis fixing pad 7d in the Z direction.

The support pins 7a support the upper and right sides of the magnetic tape cartridge W with two pins respectively.

The X-axis fixing pad 7b gives parallel displacement for a contact portion 7e, which is made of a polyacetal resin, by a reciprocal drive means such as an air slide table, thereby allowing the contact portion 7e to come into contact with the magnetic tape cartridge W from the left side in FIG. 1. Thus X-axis fixing pad 7b fixes the magnetic tape cartridge with the support pins 7a in X direction.

Similarly, the Y-axis fixing pad 7c has a contact portion 7f, which is made of a polyacetal resin. It gives Y-direction displacement for the contact portion 7f by a reciprocal drive means, fixing the magnetic tape cartridge in Y direction. The Z-axis fixing pad 7d also has a contact portion 7g made of a polyacetal resin. It can displace the contact portion 7g in X direction over the magnetic tape cartridge W and lower it by two sets of reciprocal drive means, thereby fixing the magnetic tape cartridge W with the inspection table 5 in Z direction.

The polyacetal resin is used for the protection of the cartridge case 101 and other appropriate materials which are softer than the material of the cartridge case 101 may be selected.

Next, the inspection unit which is a part of the inspection apparatus 1 and employed for each inspection will be described.

[Operation Force Inspection Unit 10]

Figure 4:
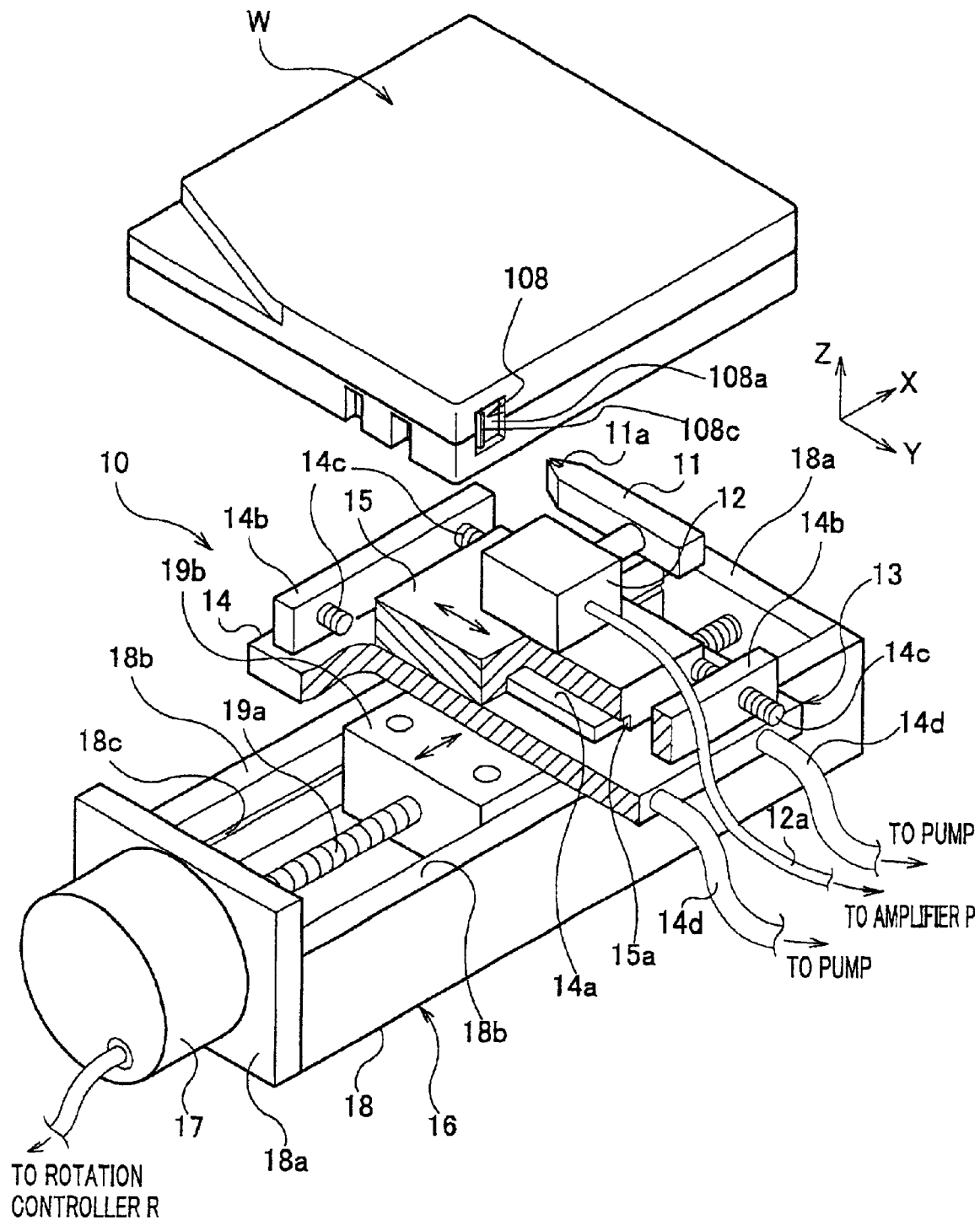
FIG. 4 is a perspective view with a local broken portion showing the operation force inspection unit.

FIG. 4 is a perspective view with a local broken portion showing the operation force inspection unit 10, which is used for measuring the force required for sliding the inadvertent erasing protector 108.

In the operation force inspection unit 10 as shown in FIG. 4, an operation arm 11 is secured to a load cell 12, which is capable of measuring the compression and tensile loads in the sliding direction (X direction) of the inadvertent erasing protector 108. And the operation arm 11 can displace united with the load cell 12. The operation arm 11 along with the load cell 12 can make parallel displacement—the direction of moving close to or away from the magnetic tape cartridge W—by an air slide table 13. Further the operation arm 11 can make parallel displacement in X direction by a ball screw slider 16 driven by a servo motor 17.

The end of the arm 11 with a rectangular cross section has a wedge, on which a holding groove 11a slightly wider than the thickness of the rib 108c is carved. The length of the wedge ridge line of the arm 11 is a little shorter than that of the rib 108c, thereby allowing the holding groove 11a to mate with the rib 108c when the arm 11 approaches it. Therefore, the arm 11 is capable of imposing the force on the rib 108c in both opening and closing directions. In the present embodiment, the arm 11 is a beam with a rectangular cross section, though any shape may be acceptable as long as a groove to mate with the rib 108c can be carved on the wedge.

In the case of a magnetic tape cartridge in conformity with the LTO standard, the width of the holding groove 11a of 1.14–1.16 mm and the wedge apex angle of 50–60 deg. will prevent the interference with the cartridge case 101 when the holding groove 11a is mated with the rib 108c.

The load cell 12 is a unit which is capable of measuring both compression and tensile loads, including a strain gauge or a piezoelectric crystal. The data detected by the load cell 12 is transmitted by a cable 12a to a generally known amplifier P, where the data is translated into the load to be sent to a computer (not shown) that controls the measured data.

The air slide table 13 is a generally known unit, which employs the air pressure for sliding a table. The air slide table 13 includes a lower table 14 and an upper table 15 which slides on the lower table 14. A rail 14a is provided on the lower table 14 in Y direction. A groove 16a of the upper table 15 mates with the rail 14a, thereby allowing the upper table 15 to move slidably. The load cell 12 is secured on the upper surface of the upper table 15 and thus can be displaced reciprocally in Y direction by the air slide table 13. Stoppers 14b, which restrict the displacement of the upper table 15, are provided at both limits of displacement on the upper surface of the lower table 14. Stroke adjusters 14c, which are in contact with the upper table 15, are screwed into the stoppers 14b. The fine adjustment of the stop position of the upper table 15 can be performed by the stroke adjusters 14c, since the upper table 15 is stopped when it is in contact with the stroke adjusters 14c. Air tubes 14d, which are connected to a pump controlled by an air control unit, are connected to the lower table 14. The upper table 15 approaches the magnetic tape cartridge W when the air is supplied to one of the air tubes 14d, on the other hand it goes apart from when the air is supplied to the other.

The stroke adjusters 14c are so arranged that the arm 11 may stop immediately in front of the rib 108c when the arm 11 approaches the inadvertent erasing protector 108. On the other hand they are so arranged that the arm 11 may withdraw to a desirable position to avoid the interference with moving of the magnetic tape cartridge W when the arm 11 comes away from the inadvertent erasing protector 108.

The air slide table 13 is for giving parallel displacement for the load cell 12 in Y direction. So other means having the same capability such as a single axis actuator instead of the air slide table may be selected alternatively. However, the air slide table is preferable taking into the consideration the promptness of operation, the supply of power in an assembly line and the cost.

The ball screw slider 16 gives parallel displacement in X direction for the air slide table 13. The ball screw slider 16 includes mainly the servo motor 17, a guide frame 18, a ball screw shaft 19a and a ball nut table 19b. The servo motor 17 is controlled rotationally by a rotation controller R (not shown). The rotation shaft (not shown) of the servo motor 17 is coaxially connected to the ball screw shaft 19a. The main body of the servo motor 17 is secured on the external surface of the guide frame 18. The guide frame 18 is a rectangle supporting the ball nut table 19b slidably. The ball screw shaft 19a is supported slidably in approximately center of each opposite shorter side of the guide frame 18. Guide grooves 18c are carved on the inner surface of the longer sides of the guide frame 18 in the longitudinal direction (X direction). The ball nut table 19b is a box-like table with the projections (not shown) on its sides facing the inner surfaces of the longer sides of the guide frame 18. These projections are inserted into the guide grooves 18c, thus allowing the ball nut table 19b to make parallel displacement in X direction. The combination of the guide grooves 18c and the projections may be substituted by a rod as a rail and a hole penetrating a ball nut table for mating with the rod. The ball nut table 19b is driven reciprocally in X direction with the built-in nut of the ball screw, into which the ball screw shaft 19a is screwed. The arm 11 can move reciprocally in X direction by the ball screw slider 16 through the air slide table 13, the lower table 14 of which is fixed on the upper surface of the ball nut table 19b.

Since the ball screw slider 16 is for giving parallel displacement for the arm 11 in X direction, another mechanism such as a single axis actuator or a single axis robot can be alternatively employed instead of the combination of a ball screw mechanism and a servo motor. However, the mechanism used for the present embodiment is preferable, which is capable of performing the accurate position control obviating the undesirable vibration, since the arm 11 requires the displacement in the direction of load measurement in the present embodiment.

The operation of the operation force inspection unit 10 will be described.

The arm 11 waits for the inadvertent erasing protector 108—which is in the write position—at the position where the X location of the holding groove 11a is the same as that of the rib 108c. When the magnetic tape cartridge W is positioned, the air controller controls the valve to supply the air to one of the air tubes 14d so that the upper table 15 may approach the magnetic tape cartridge W. The upper table 15 consequently slides towards the inadvertent erasing protector 108. The arm 11 accordingly makes parallel displacement toward the inadvertent erasing protector 108. The upper table 15 stops when the holding groove 11a mates with the rib 108c and the upper table 15 hits the stroke adjusters 14c. The signal indicating stopping of the upper table 15 is sent to the rotation controller R.

The rotation controller R drives the servo motor 17 to rotate in one direction (hereinafter referred to as positive direction). The screw shaft 19a connected to the servo motor 17 rotates in the positive direction, and the nut table 19b slides in X positive direction. The arm 11 slides in X positive direction and imposes the force on the rib 108c held by the holding groove 11a in X positive direction, thereby sliding the inadvertent erasing protector 108 to the write inhibition position. The reaction force acts on the arm 11, which the inadvertent erasing protector 108 generates by the friction and the bending of parts while it slides. The arm 11 transfers the reaction force to the load cell 12 as compression force. If a strain gauge is, for example, used in the load cell 12, the reaction force will be detected as minute electric resistance change. The electric resistance change is sent to the amplifier P, where it is translated into the load and displayed or printed out. The servo motor 17 rotates further until the inadvertent erasing protector 108 opens completely. The position accuracy of the inadvertent erasing protector 108 is maintained within ±20 $\mu$m, since the sliding displacement is controlled accurately by the servo motor 17 and the ball screw mechanism. The load cell 12 continues measuring the load required for sliding the inadvertent erasing protector 108. The amplifier P translates the electric data generated by the load cell 12 into the load every time it receives the data, and displays the maximum value.

Next the rotation controller R drives the servo motor 17 in the opposite direction, thereby sliding the nut table 19b—the arm 11—in X negative direction. The arm 11 slides the inadvertent erasing protector 108 toward the write position. The servo motor 17 is controlled to continue the rotation until the inadvertent erasing protector 108 closes completely. The load cell 12 continues measuring the reaction force imposed by the rib 108c. The amplifier P translates the electric data generated by the load cell 12 into the load every time it receives the data, and displays the maximum value.

The air controller drives the valve to supply the air to the other of the air tubes 14d, thereby sliding the upper table 15 in Y positive direction. The upper table 15 stops hitting the stroke adjusters 14c. The supply of air is stopped and all the apparatus is reset to the initial waiting status.

[Door Open Force Inspection Unit 20]

Figure 5:
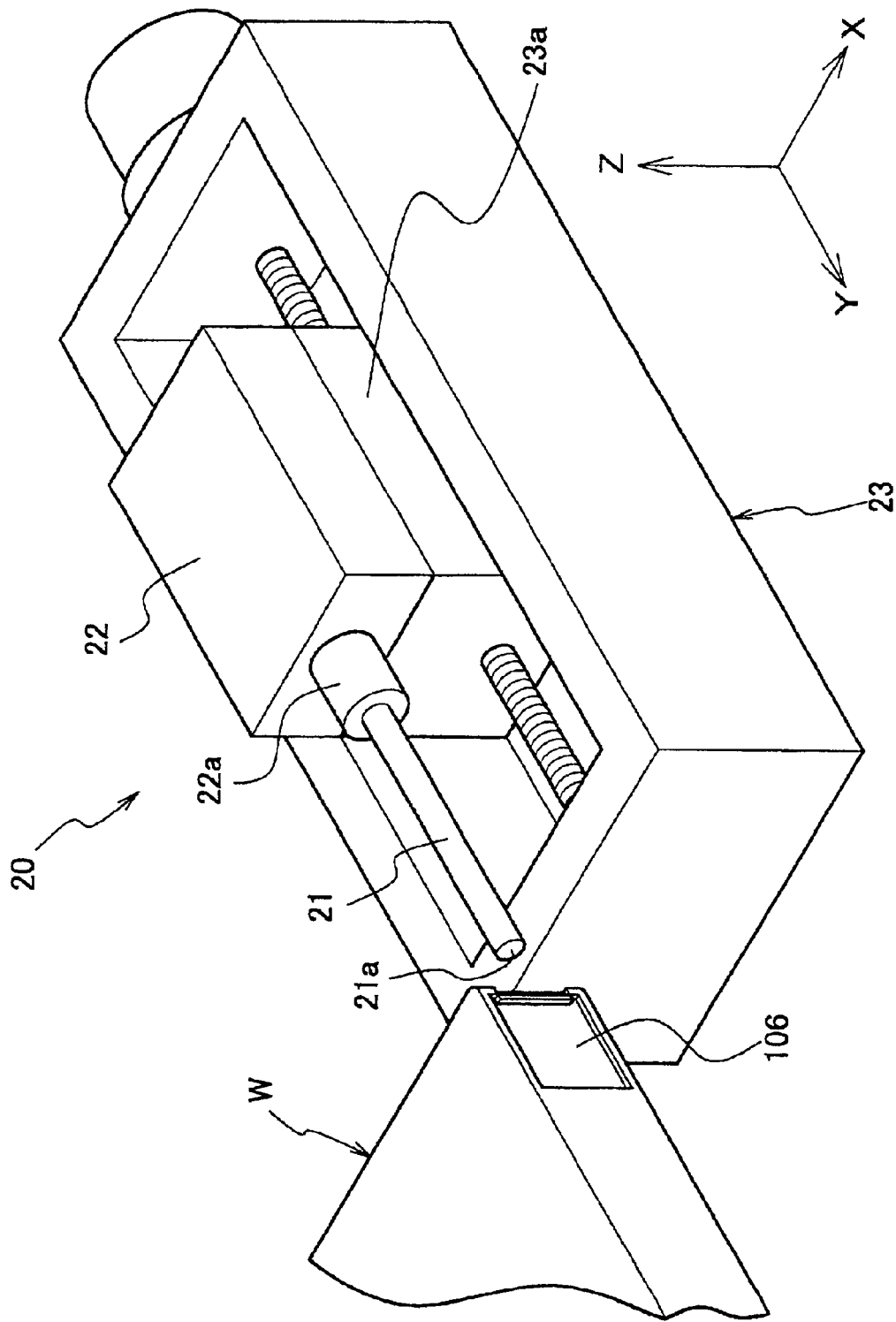
FIG. 5 is a perspective view showing the door opening force inspection unit.

The door open force inspection unit 20, which measures the force required for opening the sliding door 106 that opens or closes the opening 101C for extracting the magnetic tape, will be described referring to FIG. 5. The descriptions would be omitted for the items which are the same as those of the operation force inspection unit 10 in the following explanation.

In the door open force inspection unit 20, a probe 21 of a rod, which opens the sliding door 106 in contact with its end, is connected to a measurement section 22a of a load cell 22 measuring the compression load like the load cell 12. The load cell 22 and the probe 21 are secured on a ball nut table 23a of a ball screw slider 23 like the ball screw slider 16, thereby capable of making parallel displacement in the direction of opening or closing the sliding door 106 (Y direction). The probe 21 is placed in Y direction and a head surface 21a of the probe 21 falls in line with the sliding door 106.

An amplifier (not shown) outputs the load, which is translated from the compression load signal detected by the load cell 22, to a computer (not shown) managing the measured data.

Another means reciprocating the load cell 22 such as an air cylinder or an air slide table may be alternatively employed instead of the ball screw slider. However, a means which is capable of controlling the position and the speed appropriately is preferable so that the load at the start of opening of the sliding door 106 can be measured correctly, restricting the vibration at hitting of the probe 21 against the sliding door 106.

[Release Force Inspection Unit 30]

Figure 6:
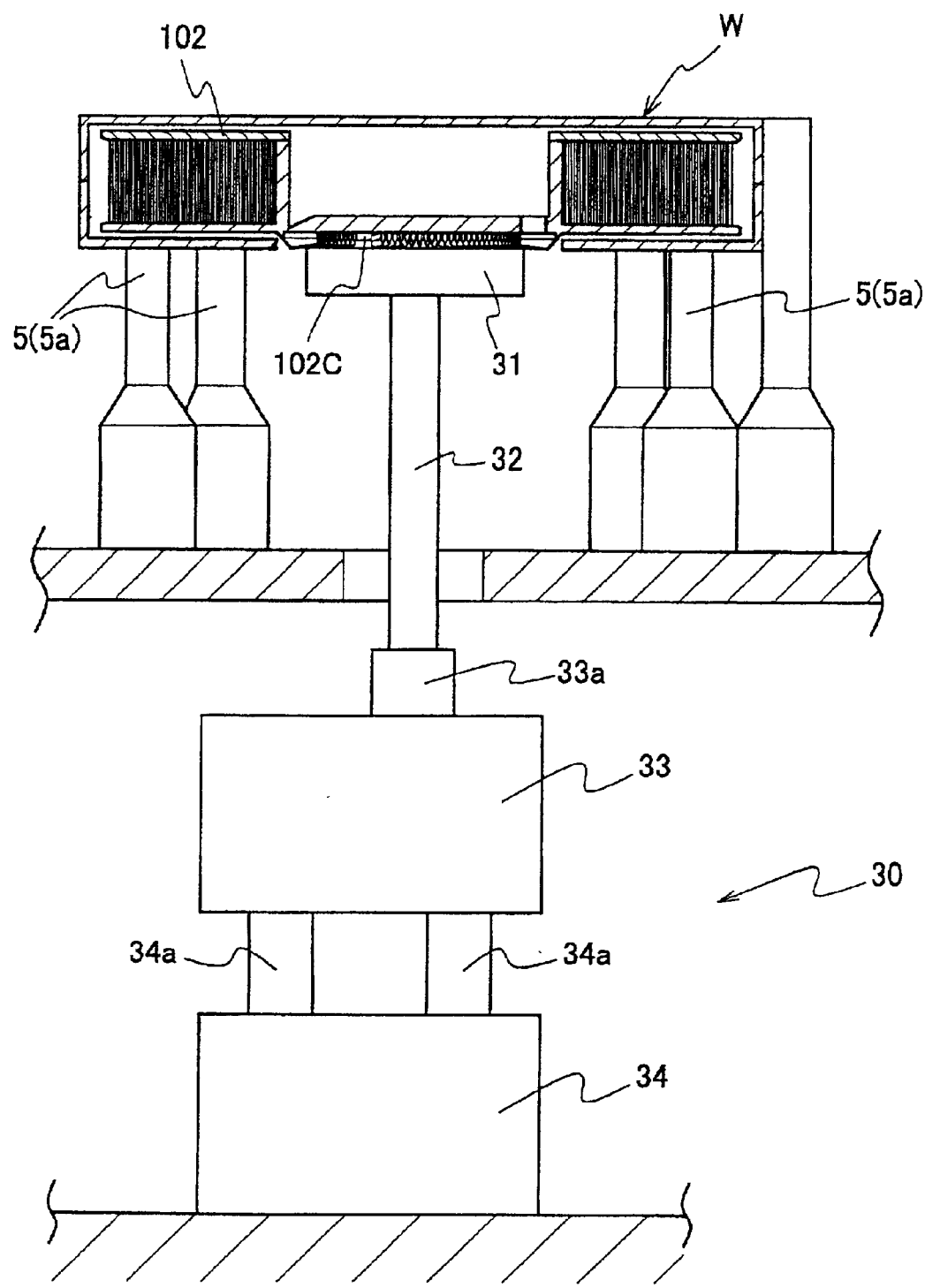
FIG. 6 is a sectional view for describing the release force inspection unit.

The release force inspection unit 30 will be described referring to FIG. 6. The load required for releasing the lock mechanism of the reel 102 is equivalent with that of the driving face gear of the drive unit thrusting up the release pad 105 against the compression coil spring 104. In the present embodiment, the load—produced by the compression coil spring 104 while it is compressed a given length by thrusting up the overall reel 102.

The release force inspection unit 30 includes a probe 31 for thrusting up the face gear 102C, a connecting rod 32 for thrusting the probe 31 from below, a load cell 33 for measuring the compression load, an air cylinder 34 for displacing the probe 31 and the load cell 33 vertically.

The probe 31 is a disk, which is slightly smaller than the face gear 102C and has a top plane surface. It goes without saying that a face gear to engage with the face gear 102C may be provided on the top surface of the probe 31. The probe 31 is made of a metal plate obviating the undesirable deformation.

The load cell 33 is the same type of the load measurement unit as the load cell 12. On the measurement section 33 the rod 32 is secured, the top end of which is fixed to the lower surface of the probe 31.

The air cylinder 34 is a generally known air cylinder with piston rods 34a. The piston rods 34a are so arranged that they thrust out when the air is supplied to one of the two air intakes (not shown) or withdraw when the air is supplied to the other. In this embodiment, the piston rods 34a thrust out or withdraw vertically. The load cell 33 is secured on the top ends of the piston rods 34a. A stopper (not shown) adjusts the stop position of the piston rods 34a so that it stops when the reel 102 is raised a given height.

An amplifier (not shown) translates the compression load signal detected by the load cell 33 into the load and sends it to a computer (not shown).

An air slide table or a motor may be employed for the means for displacing the load cell 33 vertically instead of the air cylinder. In the case of the air cylinder, it may be placed on the side of the load cell instead of right under.

[Contact Inspection Unit 40]

Figure 7:
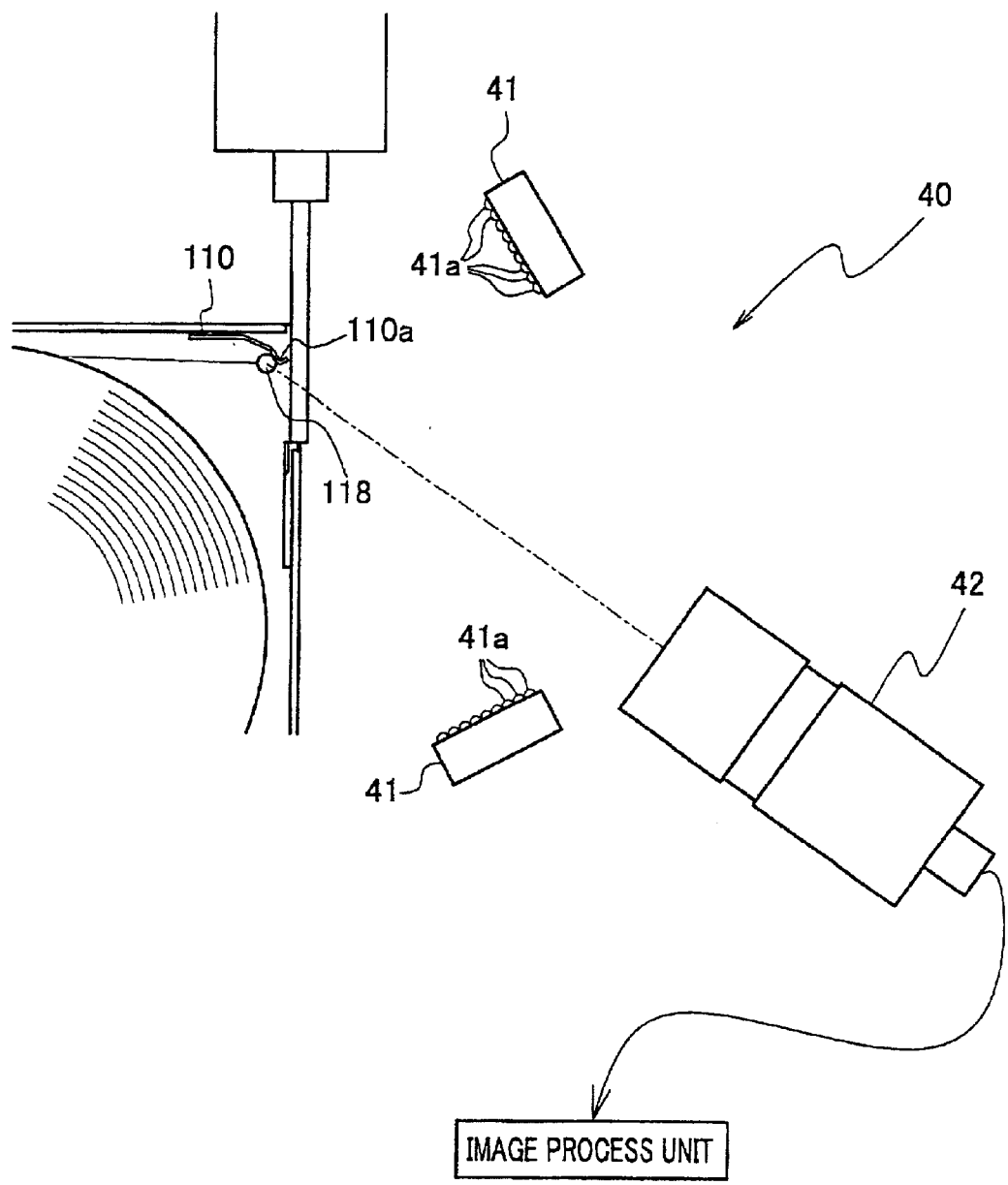
FIG. 7 is a top view showing the contact inspection unit.

The contact inspection unit 40, which is employed for inspecting the contact conditions of the leader pin 118 and the press member 110a of the leader pin spring 110, will be described. As shown in FIG. 7, the contact inspection unit 40 includes; a CCD camera 42 and an image process unit 43 which makes the judgment of good/no good by analyzing the images taken by the CCD camera 42. The CCD camera 42 takes the images of the leader pin 118 and the leader pin spring 110 (the press member 110a), which are illuminated by the two lights 41. The image process unit 43 determines that the contact conditions are no good with a gap if a shadow exists between the leader pin 118 and the leader pin spring 110 or good if no shadow exists.

Each of the light 41 has plural light emitting diodes 41a, which are arrayed in both horizontal and vertical directions on a plane. The use of the plural light emitters is to restrict the undesirable shadow created by other causes than the gap between the leader pin 118 and the leader pin spring 110. Electric bulbs or fluorescent lamps may be acceptable as long as they emit light with a reasonable illuminating area.

Two lights 41 illuminate the contact area of the leader pin 118 and the leader pin spring 110 from both sides of the CCD camera 42.

The CCD camera 42 is a generally known CCD camera including lenses and CCD elements, which condenses the reflected lights and forms an image on the CCD elements, sending the electric signal depending on the degree of brightness. The image taken by the CCD camera 42 is obtained as the data of pixels arrayed on the orthogonal coordinates—ex. 512×480. Further the CCD camera 42 can differentiate the gradations of 256—0through 255—for each pixel.

The CCD camera 42 is placed so that it can take images of the contact area of the leader pin 118 and the leader pin spring 110, and within at least 30 deg. right or left from the tangent.

Figure 8:
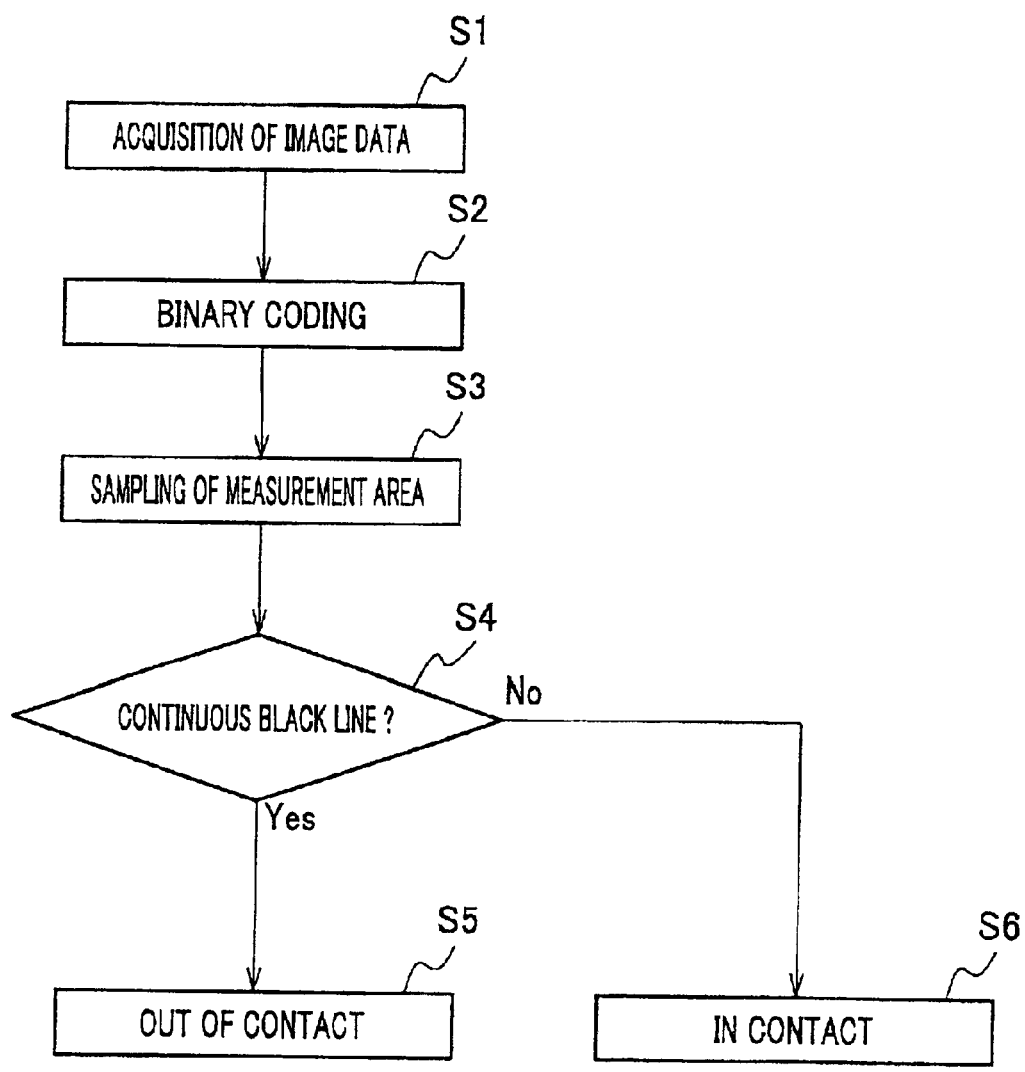
FIG. 8 is a flow chart showing the process of the contact inspection unit.

The image process unit 43 is a computer including CPU's and memories, which processes the image data sent by the CCD camera 42 and executes the programs to determine good/no good for the contact conditions of the leader pin 118 and the leader pin spring 110. As shown in the flow chart of FIG. 8, the image process unit 43 acquires the image data sent by the CCD camera 42 (step S1). The binary coding is performed to categorize the image data into white and black for each pixel introducing a threshold value, which defines a pixel as white if the gradation is not less than 100 or black if it is less than 100 (step S2). The sampling of the measurement area is performed by differentiating the images which cover the area adjacent to the contact area of the leader pin 118 and the leader pin spring 110 by trimming (step S3). Next the judgment is made on whether or not a continuous vertical black line exists in the sampled area (step S4). If the black line exists, it will be judged that the leader pin 118 and the leader pin spring 110 are not in contact with each other. If it doesn't exist, it will be judged that the leader pin 118 and the leader pin spring 110 are in contact with each other.

When the contact of the leader pin 118 and the leader pin spring 110 is inspected by the shadow, such a case that no shadow exists between them will not occur. The present embodiment presents a method which allows deleting the irrelevant shadows by introducing the appropriate threshold value.

The inspection of the contact between the leader pin 118 and the leader pin spring 110 is available while the sliding door is open. Therefore, the measurement should be performed while the door open force inspection unit 20 is in process and the sliding door 106 is opened, in the present embodiment.

[Flatness Inspection Unit 50]

Figure 9:
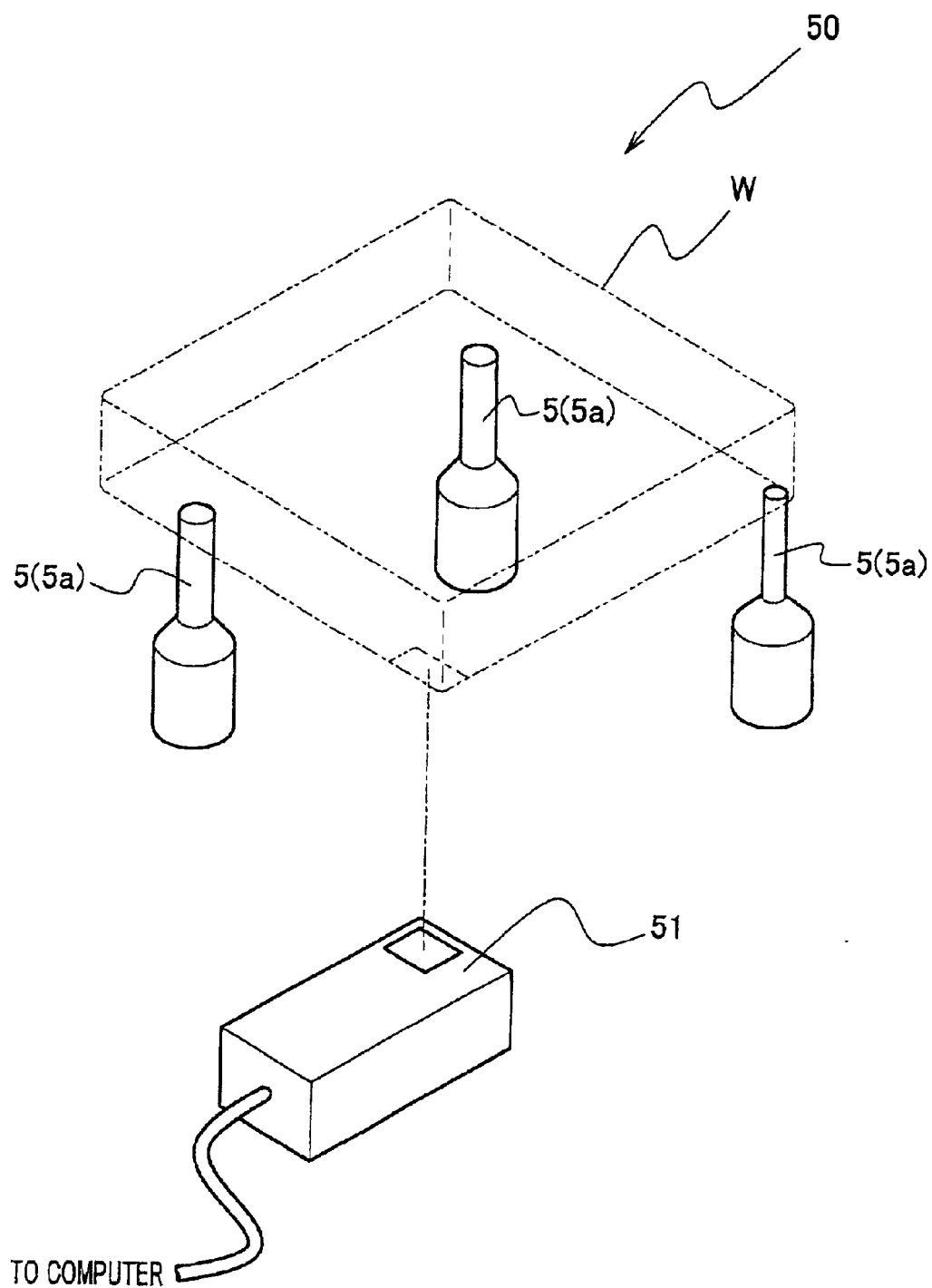
FIG. 9 is a perspective view showing the flatness inspection unit.

The flatness inspection unit 50, which is employed for inspecting the flatness of the lower surface of the magnetic tape cartridge W, will be described referring to FIG. 9. FIG. 9 is a perspective view showing the flatness inspection unit. Other portions than the flatness inspection unit 50 are omitted in FIG. 9.

The flatness inspection unit 50 includes three pins 5a which serve as the inspection table 5, a laser sensor 51 for measuring the height of a given position of the cartridge case 101 and a computer (not shown) which receives the data measured by the laser sensor 51 and performs the judgment on the inspection.

The three pins 5a are placed so that their heights are all the same, and support the rear surface near the three of four corners of the cartridge case 101.

The laser sensor 51 is placed so that it may measure the height of the lower surface near the remaining one corner which is not supported by the pins 5a. The laser sensor 51 includes a light emitting portion for projecting the laser light to the measurement point from below the cartridge case 101 and a light receiving platform (not shown) for receiving the laser light reflected by the cartridge case 101. It sends the distance between the measurement point and the sensor itself to a computer. The computer executes the program which determines whether or not the distance sent by the laser sensor 51 lies within a given range of the value; the work is good if it is within the range or no good if it isn't.

[CM Inspection Unit 60]

The inspection unit for reading and writing of the cartridge memory 109 (CM inspection unit 60) will be described.

The cartridge memory 109 is an element, with which the non-contact reading and writing of the control information peculiar to the magnetic tape cartridge W with a radio wave is available. In the present embodiment, the inspection of normal reading and writing of the cartridge memory 109 is performed and the manufacturing control information is written into it after each inspection.

Figure 10:
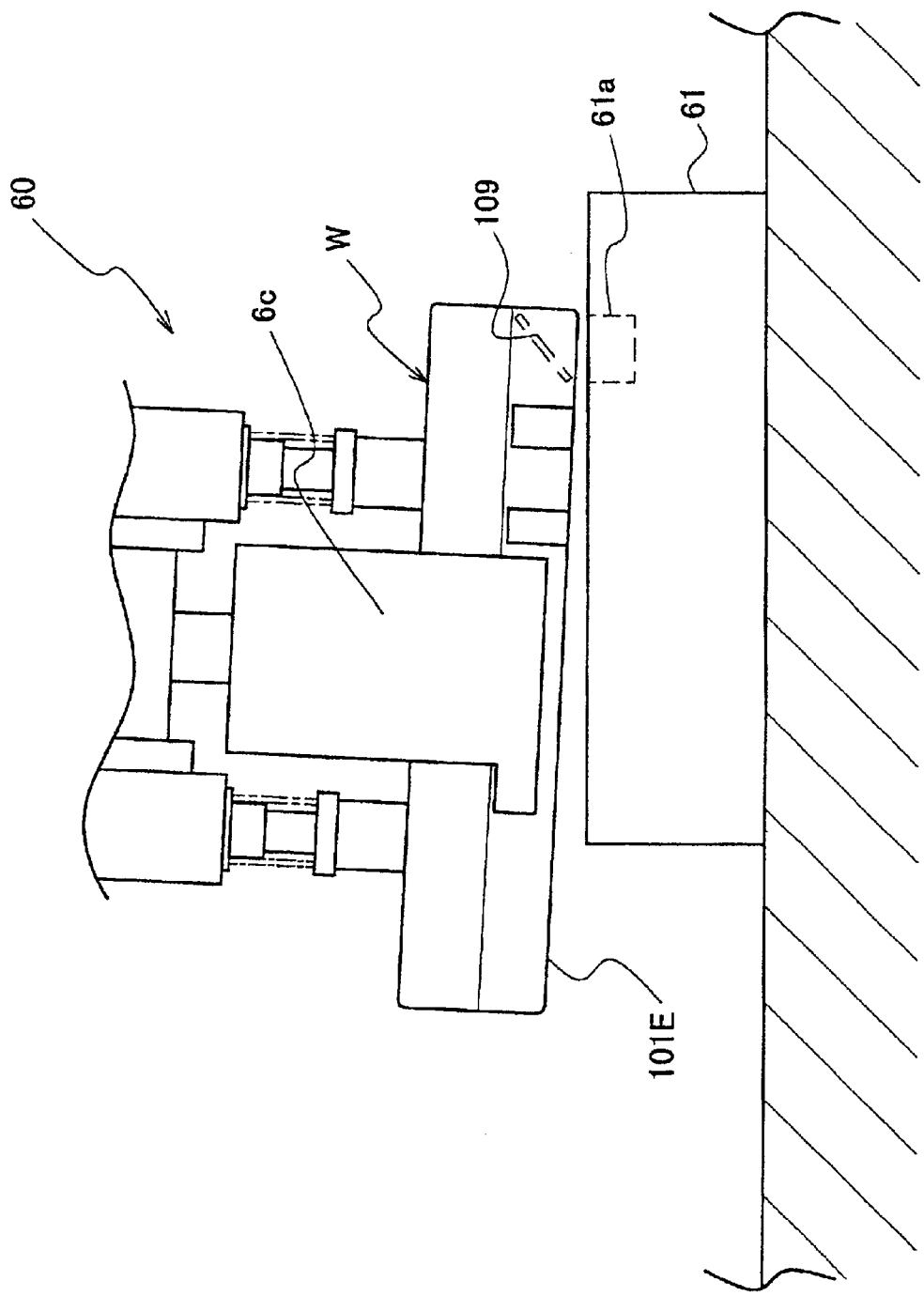
FIG. 10 is a side view showing the CM inspection unit.

As shown in FIG. 10, the cartridge memory 109 is required to place close to a read/write unit 61 in a given position in order that the inspection of reading and writing is conducted for the cartridge memory 109. After the inspections performed with the inspection units described before are completed, the inspection of reading and writing of the cartridge memory 109 should be performed. The sequence is: the read/write unit 61 is brought in while the robot 6 picks up and moves the magnetic tape cartridge W toward the departure platform 3, and the robot 6 places the magnetic tape cartridge W close to the read/write unit 61 in a given position.

The read/write unit 61 is a generally known unit, which has a radio wave transmitter/receiver 61a for reading and writing of the cartridge memory 109 on the part of the upper surface of its box-like main body.

The robot 6 moves the magnetic tape cartridge W so that the cartridge memory 109 may come close over the radio wave transmitter/receiver 61a. The magnetic tape cartridge W is preferably positioned slightly tilted over the radio wave transmitter/receiver 61a in the manner that one side of the magnetic tape cartridge W where the cartridge memory 109 is housed is closer to the upper surface of the read/write unit 61 (the radio wave transmitter/receiver 61a) and the other side opposite to the former is remoter from the upper surface. In the case of a magnetic tape cartridge W in conformity with the LTO standard, the distances between the tape cartridge and the upper surface of the read/write unit 61—0.4±0.1 mm for the closer side and 2±0.3 mm for the remoter side—should be preferably directed to the robot 6.

A six-axis robot is preferable for the robot 6 which is employed for moving the magnetic tape cartridge W as described above.

[Operation of the Inspection Apparatus 1]

The inspection apparatus 1 described above will permit an efficient inspection of the magnetic tape cartridge W.

A first magnetic tape cartridge W, which has been assembled in the assembly line (not shown), is carried in to the inspection apparatus 1 by the belt conveyer 2a of the arrival platform 2 and kept waiting at a given position by the stopper 2b. A second magnetic tape cartridge W assembled earlier is being inspected on the inspection table 5. The robot 6 holds the first magnetic tape cartridge W with one of the chucks 6c, which is to be inspected, before the inspection of the second magnetic tape cartridge W is finished.

When it is finished, the second magnetic tape cartridge W after inspection is released from the fixture 7 and grabbed by the other free chuck 6c of the robot 6. The robot rotates the hand 6b 180 deg. around the arm 6a and rests the first magnetic tape cartridge W on the inspection table 5.

The X-axis fixing pad 7b, the Y-axis fixing pad 7c, the Z-axis fixing pad 7d of the fixture 7 are actuated simultaneously to fix the first magnetic tape cartridge W in X, Y, and Z directions.

The operation force inspection unit 10, the door opening force inspection unit 20 and the release force inspection unit 30 are operated simultaneously. They measure the operation force of the inadvertent erasing protector 108, the load required for opening the sliding door 106 and the force required for thrusting up the reel 102 a given height respectively. While the door opening force inspection unit 20 keeps the sliding door 106 open, the contact inspection unit 40 takes the images of the contact area between the leader pin 118 and the leader pin spring 110 and makes judgment on their contact or non-contact.

The laser sensor 51 of the flatness inspection unit 50 measures the height of a given point of the first magnetic tape cartridge W while it is rested on the three pins 5a. The flatness inspection unit 50 determines good/no good of the flatness of the first magnetic tape cartridge W.

The robot 6 picks up the first magnetic tape cartridge W with the chuck 6c and moves it so that the cartridge memory 109 is positioned over the radio wave transmitter/receiver 61a of the read/write unit 61. Then the robot 6 stops instantly keeping the base plate 101E of the cartridge case 101 slightly tilted relative to the upper surface of the read/write unit 61 as shown in FIG. 10, and the read/write unit 61 performs the read/write inspection for the cartridge memory 109. Subsequently, the robot 6 rests the first magnetic tape cartridge W on the belt conveyer 3a of the departure platform 3. The belt conveyer 3a carries out the first magnetic tape cartridge W after inspection to the subsequent process.

The inspection apparatus 1 according to the present embodiment enables four inspections of a work in parallel while the fixture 7 performs one fixing operation for the work of the magnetic tape cartridge W. It leads to the improvement of efficiency of the inspection by obviating the time required for fixing the work for each inspection, and performing the inspections in parallel.

When a modification is made to the layout of an assembly line, the present invention can allow easy accommodation to it by moving the whole inspection apparatus 1 and connecting the arrival platform 2 to the last portion of the assembly line. If casters and brakes are prepared for the inspection apparatus 1, the accommodation will be easier. Also the present embodiment requires only the adjustment of the inspection apparatus 1 when the adjustments such as leveling etc. are performed after accommodating the inspection apparatus 1 to the layout modification.

Suppose the inspection data is transmitted on-line by such as LAN and a quality control division plans to control it collectively. The inspection apparatus 1 according to the embodiment will facilitate it by preparing a computer which is capable of keeping the integrated control over the inspection apparatus 1, and adding the required adjustment to the computer only. Also the inspection apparatus 1 allows the efficient modification and adjustment when the layout modification of an assembly line is necessary.

In this embodiment, a magnetic cartridge tape W has been referred to as the work as an example. It goes without saying that the present invention can be applied to the quality inspection of a product generally such as an optical magnetic disk or camera, etc. in addition to the magnetic tape cartridge W.

What is claimed is:

1. An inspection apparatus, which is directly connected to an assembly line and employed for inspections of a work after assembly, comprising:
   an arrival platform to which said work after assembly is carried in;
   an inspection table on which said work is inspected;
   a departure platform from which said work after inspection is carried out;
   a transfer unit for moving said work which has completed inspections on said inspection table to said departure platform as well as moving said work carried in to said arrival platform to said inspection table;
   a fixture for fixing said work moved to the inspection table while inspecting said work; and
   a plurality of inspection units configured to perform inspections in parallel while said work is fixed on said inspection table,
   wherein a magnetic tape cartridge is introduced as said work and said inspection apparatus further comprises at least two of the following inspection units:
   a write protect operation force inspection unit for measuring a force required for handling an inadvertent erasing protector;
   a door open force inspection unit for measuring a force required for opening a sliding door which opens or closes an opening for extracting a magnetic tape;
   a reel lock release force inspection unit for measuring a force required for releasing a locking mechanism for locking a reel; and
   a leader pin/spring contact inspection unit for inspecting contact conditions between a leader pin springs which holds a leader pins, and said leader pin.

2. The inspection apparatus according to claim 1, wherein a carrier which carries in said work to said arrival platform comprises a conveyer.

3. The inspection apparatus according to claim 1, wherein a carrier which carries out said work from said departure platform comprises a conveyer.

4. The inspection apparatus according to claim 1, wherein said transfer unit comprises an all-purpose robot with multiaxial articulated joints, which has two chucks positioned axially symmetrical around the axis of an arm of said robot.

5. The inspection apparatus according to claim 4, wherein said all-purpose robot of said transfer unit comprises a six-axis robot.

6. The inspection apparatus according to claim 1, wherein said transfer unit comprises a crane, which is capable of moving said work from said arrival platform to said inspection table, and from said inspection table to said departure platform.

7. The inspection apparatus according to claim 1, wherein a fixing pad of said fixture comprises a polyacetal resin.

8. The inspection apparatus according to claim wherein said inspection apparatus comprises said write protect operation force inspection unit, wherein a moving means of said write protect operation force inspection unit, by which an operation arm for handling said inadvertent erasing protector moves close to or away from said magnetic tape cartridge, comprises an air slide table.

9. The inspection apparatus according to claim 1, wherein said inspection apparatus comprises said write protect operation force inspection unit, wherein the moving means of said write protect operation force inspection unit, by which said operation arm for handling said inadvertent erasing protector moves close to or away from said magnetic tape cartridge, comprises a single axis actuator.

10. The inspection apparatus according to claim 1, wherein said inspection apparatus comprises said write protect operation force inspection unit, wherein a moving means of said write protect operation force inspection unit, by which said operation arm for handling said inadvertent erasing protector moves in the direction perpendicular to that of moving close to or away from said magnetic tape cartridge, comprises a ball screw slider including a ball screw mechanism and a servo motor.

11. The inspection apparatus according to claim 1, wherein said inspection apparatus comprises said write protect operation force inspection unit, wherein the moving means of said write protect operation force inspection unit, by which said operation arm for handling said inadvertent erasing protector moves in the direction perpendicular to that of moving close to or away from said magnetic tape cartridge, comprises a single axis actuator or a single axis robot.

12. The inspection apparatus according to claim 1, wherein said inspection apparatus comprises said write protect operation force inspection unit, wherein said operation arm for handling said inadvertent erasing protector has a wedge, on which a groove to mate with a rib of said inadvertent erasing protector is carved.

13. The inspection apparatus according to claim 1, wherein said inspection apparatus comprises said door open force inspection unit, wherein a moving means of said door open force inspection unit, by which a sliding door is moved reciprocally, comprises a ball screw slider including a ball screw mechanism and a servo motor.

14. The inspection apparatus according to claim 1, wherein said inspection apparatus comprises said door open force inspection unit, wherein the moving means of said door open force inspection unit, by which the sliding door is moved reciprocally, comprises an air cylinder or an air slide table.

15. The inspection apparatus according to claim 1, wherein said inspection apparatus comprises said reel lock release force inspection unit, wherein a moving means of said reel lock release force inspection unit, by which a face gear is thrust into said cartridge case, comprises an air cylinder.

16. The inspection apparatus according to claim 1, wherein said inspection apparatus comprises said reel lock release force inspection unit, wherein the moving means of said reel lock release force inspection unit, by which said face gear is thrust into said cartridge case, comprises an air slide table or a motor.

17. The inspection apparatus according to claim 1, wherein said inspection apparatus comprises said leader pin/spring contact inspection unit, wherein images of the contact area between said leader pin and said leader pin spring are taken by a camera, a binary coding is performed on said images to categorize into white and black introducing a given threshold value, and a judgment is made for contact conditions between said leader pin and said leader pin spring based on the presence of a continuous black line on said images.

18. The inspection apparatus according to claim 17, wherein said leader pin/spring contact inspection unit comprises light emitting diodes, light valves or fluorescent lamps for illuminating said leader pine and said leader pin spring.

19. An inspection apparatus, which is directly connected to an assembly line and employed for inspections of a work after assembly, comprising:
   an arrival platform to which said work after assembly is carried in;
   an inspection table on which said work is inspected;
   a departure platform from which said work after inspection is carried out;
   a transfer unit for moving said work which has completed inspections on said inspection table to said departure platform as well as moving said work carried in to said arrival platform to said inspection table;
   a fixture for fixing said work moved to the inspection table while inspecting said work; and
   a plurality of inspection units configured to perform inspections in parallel while said work is fixed on said inspection table,
   wherein a magnetic tape cartridge is introduced as said work and said inspection apparatus comprises a cartridge case flatness inspection unit, wherein said cartridge case flatness inspection unit performs a flatness inspection after said transfer unit moves said magnetic tape cartridge to said inspection table and before said fixture fixes said magnetic tape cartridge thereon.

20. An inspection apparatus, which is directly connected to an assembly line and employed for inspections of a work after assembly, comprising:
   an arrival platform to which said work after assembly is carried in;
   an inspection table on which said work is inspected;
   a departure platform from which said work after inspection is carried out;
   a transfer unit for moving said work which has completed inspections on said inspection table to said departure platform as well as moving said work carried in to said arrival platform to said inspection table;
   a fixture for fixing said work moved to the inspection table while inspecting said work; and
   a plurality of inspection units configured to perform inspections in parallel while said work is fixed on said inspection table,
   wherein a magnetic tape cartridge is introduced as said work and said inspection apparatus comprises a cartridge case flatness inspection unit, wherein said cartridge case flatness inspection unit performs a flatness inspection after said plurality of inspections are completed and said fixture releases said magnetic tape cartridge.

21. An inspection apparatus, which is directly connected to an assembly line and employed for inspections of a work after assembly, comprising;

an arrival platform to which said work after assembly is carried in;

an inspection table on which said work is inspected;

a departure platform from which said work after inspection is carried out;

a transfer unit for moving said work which has completed inspections on said inspection table to said departure platform as well as moving said work carried in to said arrival platform to said inspection table;

a fixture for fixing said work moved to the inspection table while inspecting said work; and a plurality of inspection units configured to perform inspections in parallel while said Work is fixed on said inspection table, wherein a magnetic tape cartridge is introduced as said work and said inspection apparatus comprises a cartridge case flatness inspection unit, wherein said inspection table serves as a part of said cartridge case flatness inspection unit and comprises three pins.

22. An inspection apparatus, which is directly connected to an assembly line and employed for inspections of a work after assembly, comprising:

an arrival platform to which said work after assembly is carried in;

an inspection table on which said work is inspected;

a departure platform from which said work after inspection is carried out;

a transfer unit for moving said work which has completed inspections on said inspection table to said departure platform as well as moving said work carried in to said arrival platform to said inspection table;

a fixture for fixing said work moved to the inspection table while inspecting said work; and a plurality of inspection units configured to perform inspections in parallel while said work is fixed on said inspection table, wherein a magnetic tape cartridge is introduced as said work and said inspection apparatus comprises a read/write inspection unit which is for inspecting a memory chip inside a cartridge case, wherein said cartridge case is positioned tilted at inspection so that one side of said cartridge case, where said memory chip is housed, is placed close to the upper surface of said read/write inspection unit and the other side opposite to said one side is placed remote.

23. A method for inspecting a magnetic tape cartridge after assembly with an inspection apparatus, which is connected to an assembly line directly, said inspection apparatus comprising:

an arrival platform to which said magnetic tape cartridge after assembly is carried in;

an inspection table on which said magnetic tape cartridge is inspected;

a departure platform from which said magnetic tape cartridge after inspection is carried out;

a transfer unit for moving said magnetic tape cartridge which has completed inspections on said inspection table to said departure platform as well as moving said magnetic tape cartridge carried in to said arrival platform to said inspection table; and a fixture for fixing said magnetic tape cartridge moved to the inspection table while inspecting said magnetic tape cartridge, wherein a plurality of inspections are performed in parallel while said magnetic tape cartridge is fixed on said inspection table, said inspection apparatus further comprising:

a write protect operation force inspection unit for measuring the force required for handling an inadvertent erasing protector;

a door open force inspection unit for measuring the force required for opening a sliding door which opens or closes an opening for extracting a magnetic tape;

a reel lock release force inspection unit for measuring the force required for releasing a locking mechanism for locking a reel; and a leader pin/spring contact inspection unit for inspecting the contact conditions between a leader pin spring which holds a leader pin and said leader pin, said method comprising:

a write protect operation force inspection;

a door open force inspection;

a reel lock release force inspection; and a leader pin/spring contact inspection, wherein said write protect operation force inspection, said door open force inspection, said reel lock release force inspection and said leader pin/spring contact inspection are conducted in parallel while said fixture performs one fixing operation for said magnetic tape cartridge.

24. An inspection apparatus for a magnetic tape cassette comprising:

a write protect operation force inspection unit that measures a force required for handling an inadvertent erasing protector;

a door open force inspection unit that measures a force required for opening a sliding door which opens or closes an opening for extracting a magnetic tape;

a reel lock release force inspection unit that measures a force required for releasing a locking mechanism for locking a reel; and a leader pin/spring contact inspection unit that inspects contact conditions between a leader pin spring, which holds a leader pin, and the leader pin.

* * * * *